United States Patent [19]
Geiger

[11] 3,916,840
[45] Nov. 4, 1975

[54] COMBUSTION ENGINE HAVING A CYLINDER COMPRISING A COMBUSTION CHAMBER AND AN ANTE-CHAMBER

[75] Inventor: Istvan Geiger, Wolfsburg, Germany

[73] Assignee: Volkswagenwerk Aktiengesellschaft, Wolfsburg, Germany

[22] Filed: Aug. 27, 1971

[21] Appl. No.: 175,560

[30] Foreign Application Priority Data
Sept. 17, 1970 Germany............................ 2045874

[52] U.S. Cl........................... 123/32 ST; 123/32 SP
[51] Int. Cl.².................... F02B 19/10; F02B 19/18
[58] Field of Search........... 123/32 R, 32 ST, 32 SP, 123/32 SA, 75 B

[56] References Cited
UNITED STATES PATENTS

| | | | |
|---|---|---|---|
| 2,534,346 | 12/1950 | Fenney.............................. | 123/32 R |
| 2,758,576 | 8/1956 | Schlamann...................... | 123/32 ST |
| 2,849,992 | 9/1958 | Stillebroer........................ | 123/32 R |
| 3,443,552 | 5/1969 | Von Seggern et al............. | 123/75 B |

Primary Examiner—Charles J. Myhre
Assistant Examiner—Ronald B. Cox
Attorney, Agent, or Firm—Ernest F. Marmorek

[57] ABSTRACT

In a motor vehicle, an engine with a plurality of cylinders each comprising a combustion chamber having an inlet valve for the feeding of a fuel mixture thereto and an ante-chamber communicating with the combustion chamber and having an injection nozzle associated therewith for feeding a fuel mixture into it and a spark-plug having electrodes terminating in it, the engine when operating having a characteristic line associated therewith defining a partial brake load region and another characteristic line defining a full brake load region, a mixture dosing arrangement for providing operation of the engine within the region defined by the partial brake load characteristic under filling regulation, the mixture dosing arrangement comprising means actuating the injection nozzle only upon reaching the partial load characteristic line and at high brake loads and thereby operating the engine by controlling the fuel mixture therein.

6 Claims, 6 Drawing Figures

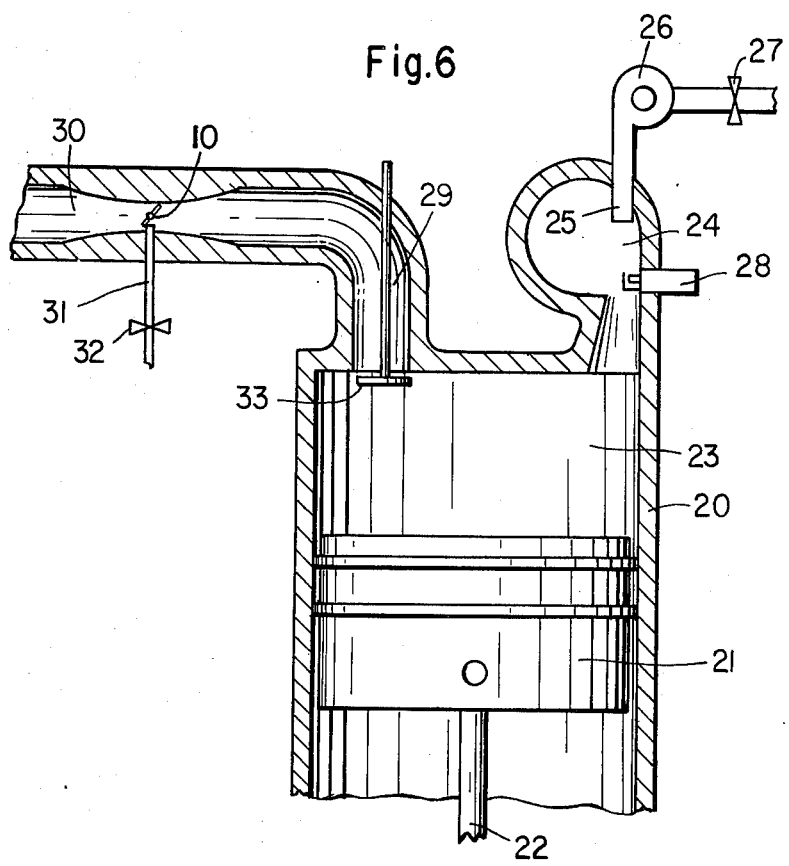

COMBUSTION ENGINE HAVING A CYLINDER COMPRISING A COMBUSTION CHAMBER AND AN ANTE-CHAMBER

FIELD OF THE INVENTION

The present invention relates to a combustion engine having a plurality of cylinders each of which has a combustion chamber having an inlet valve for the feeding of a fuel mixture and an ante-chamber communicating therewith and in which the injection nozzle of a fuel injection arrangement terminates and into which the electrodes of a spark-plug protrude.

BACKGROUND OF THE INVENTION

Combustion engines having the above-described sub-division of a cylinder volume, namely into a combustion chamber and into an ante-chamber are known, for example, from German Pat. No. 1,022,051, $46a^2$–10, of Schlamann to which reference should be had in this respect, and are described there to have generally the advantage that even in the presence of a not very combustible mixture in the actual combustion chamber, they are capable of performing the ignition reliably and at a predetermined time instant due to the feeding of a relatively fat mixture to the region of the electrodes of the spark-plug. This is especially important in motor vehicles in which the selection of the fuel composition has become recently of special interest from the view point of avoiding the presence of damaging components in the exhaust gas.

The known combustion engines having an ante-chamber and a combustion chamber operate in all load ranges, by which mainly the brake load range of the engine is understood, in a manner that the ante-chamber as well as the combustion chamber always receive a mixture of a certain composition.

SUMMARY OF THE INVENTION

It is an object of the present invention to provide a combustion engine in which a mixture regulation takes place even at high brake loads. It is another object of the present invention to provide a combustion engine which, by having a fuel regulation taking place even at high brake loads, will operate clean and free of damaging components in the exhaust gas.

According to the present invention the combustion engine is provided with a fuel mixture supply device having a construction which provides filling regulation up to a certain partial brake load line and the injection arrangement comprises means which actuate the injection nozzle only at such partial brake load line so that at the higher brake loads there is a mixture regulation.

BRIEF DESCRIPTION OF THE DRAWINGS

The invention will be more readily apparent from the following description of a preferred embodiment thereof shown, by way of example, in the accompanying drawings, in which:

FIG. 6 is a vertical sectional view through a four cycle engine embodying principles of the present invention.

DESCRIPTION OF THE PREFERRED EMBODIMENT

Figure 1:
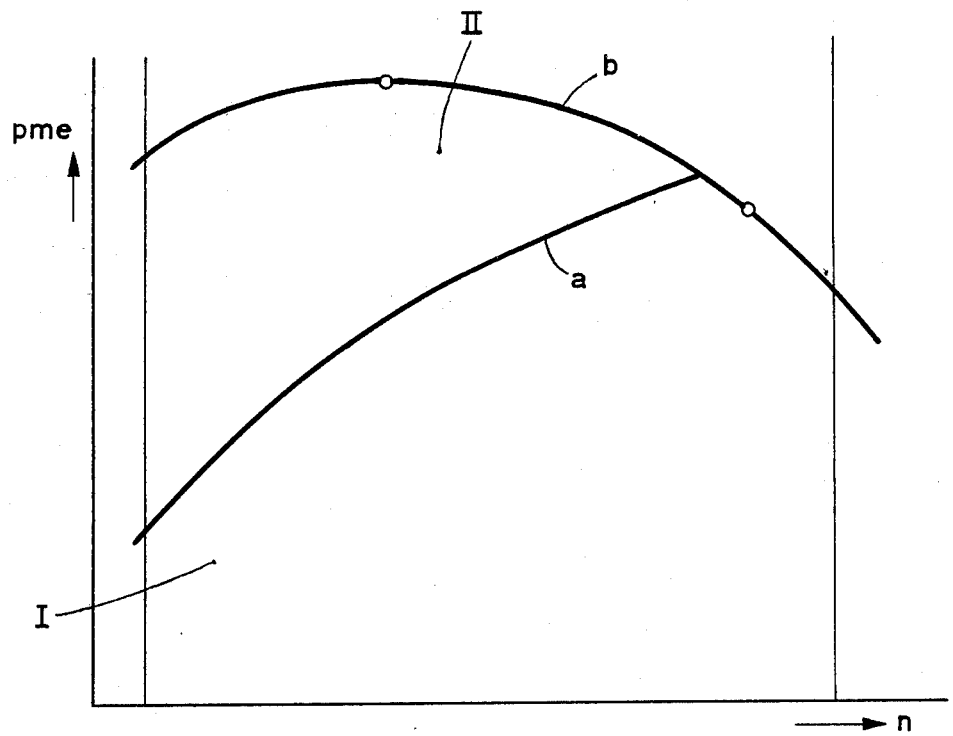
FIGS. 1 and 2 are graphical representations of the injection and mixture regulation governed by certain brake load characteristics in a combustion engine according to the present invention.

In order to explain the principles of the present invention, reference should be had to the graphical representation of the engine characteristic lines of FIG. 1 which illustrates the known relationship between the mean cylinder pressure $pme$ in $kp/cm^2$ and the number of revolutions $n$ of the engine, the latter being measured in revolutions per minute. The cylinder pressure $pme$ is known to be a function of the brake load of the engine. For different load conditions of the engine one receives different curves of which here the curve $a$ is of interest for a partial load operation, such as for ¼ of the full brake load in the lower range of the engine revolution, and the curve $b$ is of interest for the full brake load. The curve $a$ runs here in such a manner that it cuts the full brake load line $b$ at a range of engine revolutions which lies about between the points representing the maximum rotational momentum and the maximum output. According to the present invention and, as hereinafter described in more detail, the engine is constructed in such a manner that in the region I, that is under the curve $a$ representing a certain partial brake load, only the inlet valve assigned to the combustion chamber, but not the injection nozzle terminating in the ante-chamber becomes operative. It follows from the load range identified by I in FIG. 1, which also includes the idle run, that a clear filling regulation is present. In the event the mixture dosing arrangement comprises also a throttle, as will be described more specifically with respect to FIG. 4, its drive will be constructed and designed in such a manner that the throttle valve at a certain partial brake load, namely at reaching the curve $a$, is completely opened and remains open also when higher brake loads are reached.

In the higher load range identified by II which covers the area between the partial brake load identified by the curve $a$ and between the curve $b$ in FIG. 1 representing the full load, on the other hand, the injection nozzle of the ante-chamber is operative so that in this load range a mixture regulation takes place. For this purpose, as described later in connection with FIG. 4, the injection arrangement can have a valve comprising an operating mechanism placed between the fuel pump and a distributor operating the injection nozzles of the different cylinders, which operating mechanism opens such associated valve when the partial brake load line has been crossed. Preferably such operating mechanism is combined with the drive of the mixture dosing device so that in the case of a motor vehicle engine the transition from filling regulation to mixture regulation according to the present invention occurs automatically when curve "a" in FIG. 1 has been crossed in one direction and back in the other direction following a corresponding change of the accelerator position.

The sub-division into the two regions identified by I and II in FIG. 1, according to the present invention, has the advantage that at low brake loads including the idle operation one may operate the engine by controlling the fill which is especially advantageous for the ignition and for obtaining the proper air excess number important from the viewpoint of the exhaust gases, while at higher brake loads, that is, on a limited control region where a fill regulation would lead to instabilities, the injection arrangement becomes operative. With the above described arrangement according to the present invention the air excess number with respect to the maximum rotational momentum of the engine can be set.

Figure 2:
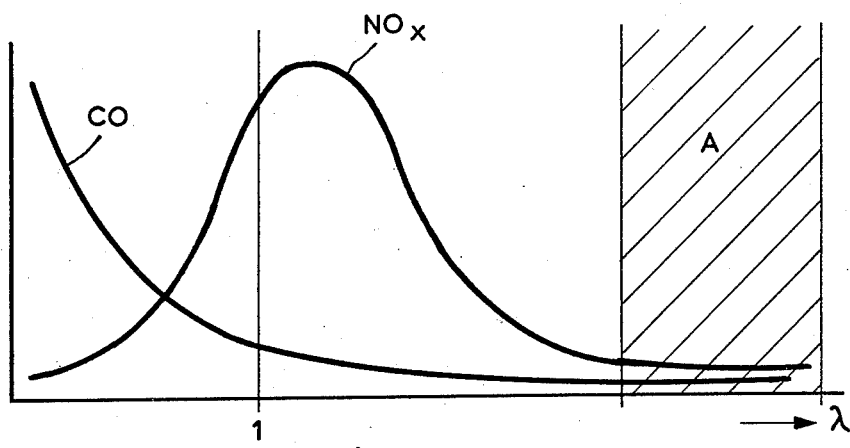

Preferably during the injection or fill regulation a mixture having an air excess number is fed to the engine at which the damaging components in the exhaust gas, among others the CO and $NO_x$ components, remain practically constant even at an increase of the air excess number. This is illustrated in FIG. 2 by plotting the relationship between the CO and $NO_x$ components in the exhaust gas with respect to the air excess number $\lambda$. In the region A lying to the right of the maxima of the curve, a further increase of the air excess number will cause practically no change in the CO and $NO_x$ components of the exhaust gas.

Figure 3:
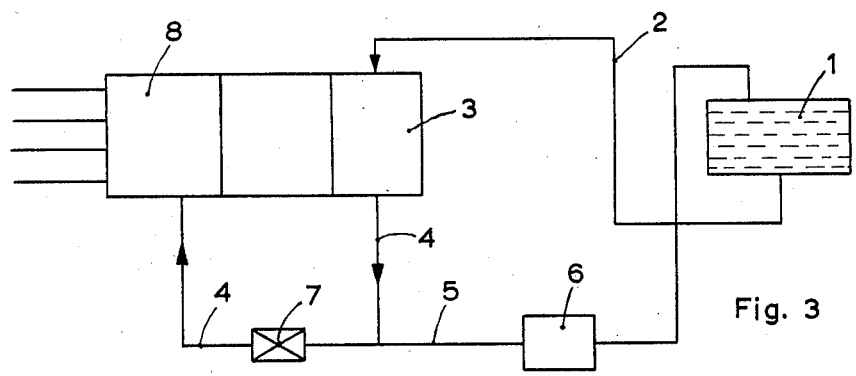
FIG. 3 is a schematic representation of an embodiment of the present invention where the engine is provided with means actuating the injection nozzle only at the higher brake load region.

With reference to FIG. 3 it is seen that a fuel tank 1 is connected by a conduit 2 with an input side of a pump 3, while an output conduit 4 of the pump 3 is returned by means of a feedback conduit 5 over a pressure regulator 6 to the fuel tank 1. The conduit 4 extends further through a valve 7 which is in connection from the drive side with an operating mechanism for a throttle valve placed in the suction conduit of an inlet valve of the combustion chamber (not shown in the figure). This means that the valve 7 releases the flow of the fuel to a distributor 8 distributing the fuel to the different cylinders (as represented by the four conduits going left) only at higher brake loads. At lower loads the entire fuel supply flows over the regulator 6 back to the tank 1.

Figure 4:
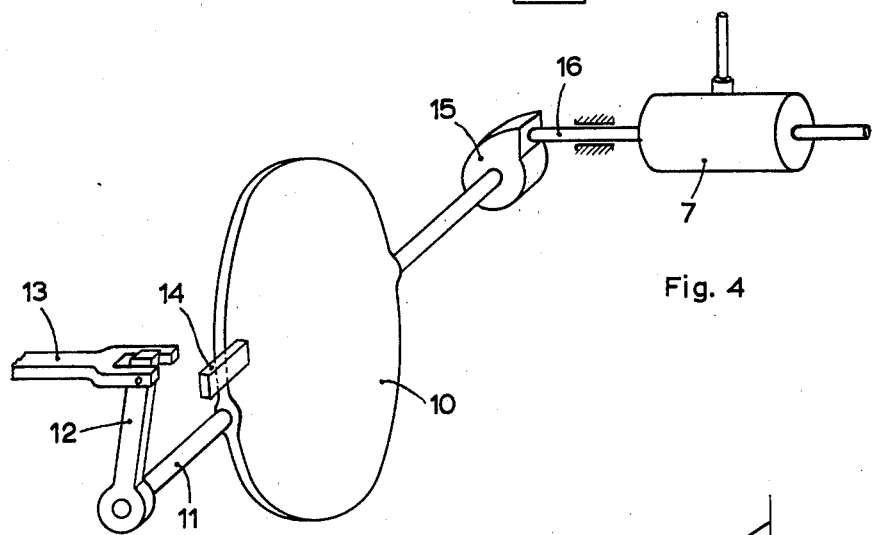
FIG. 4 is a perspective view of the parts of a combustion engine, including a throttle valve which illustrates the operation of the injection and mixture regulating arrangement according to the present invention.

FIG. 4 illustrates the valve 7 with its operating mechanism. It has been assumed that the mixture feeding arrangement for the combustion chamber contains or comprises a throttle valve 10 which is placed and arranged in a known manner in the passage of the suction conduit. The valve 10 sits on an operating shaft 11 which, by means of a lever arrangement represented by a lever 12 and 13, is connected with the accelerator in a known manner. It is also assumed that the throttle valve 10 in the position illustrated in FIG. 4 is fully open. In the illustrated embodiment it is carried to its fully opened position by means of the shaft 11 wherein it abuts against a boss 14 on the suction conduit. Inasmuch as the connection between the throttle valve 10 and the shaft 11 is constructed in the form of a friction coupling, the shaft 11 can be rotated further. As soon as the curve $a$ in FIG. 1 has been reached, the cam 15 fixed for rotation with the shaft 11 will abut against the valve stem 16 of the valve 7. Due to the construction of the valve 7, in the last described condition, the cam 15 will immediately open the valve 7 fully. The mixture control is performed by means of the distributor 8, illustrated in FIG. 3, while the air supply remains constant in the brake load region identified by II in FIG. 1. The cam 15 can at the same time be used for the control of the injection system.

Figure 5:
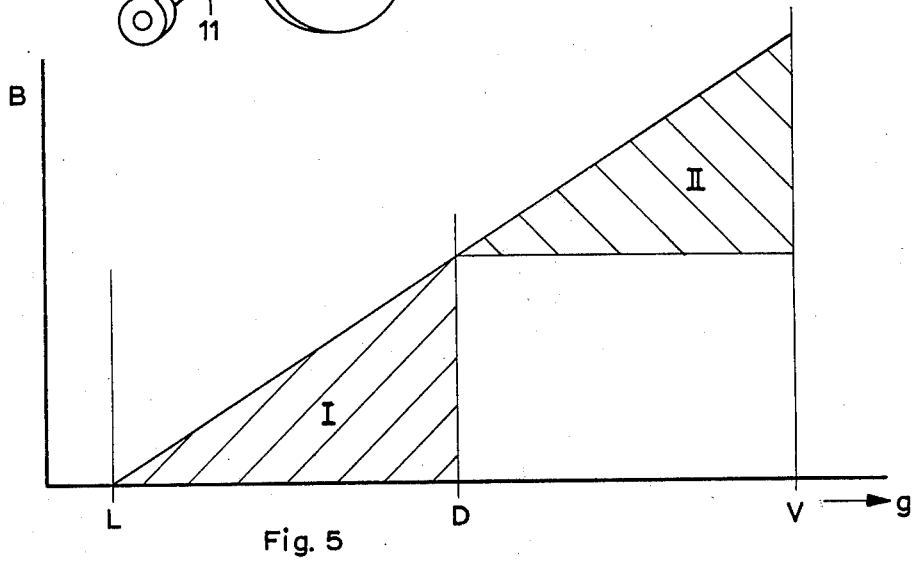
FIG. 5 is a graphical representation of the operation of the control aspects of the parts illustrated in FIG. 4.

The arrangement shown in FIG. 4 operates at a constant number of revolutions, as illustrated in FIG. 5 which is a graphical representation of the brake load B of the engine with respect to the path of the accelerator $g$, and which has been assumed to have a linear relationship between the idle position L and the full load position V of the accelerator, although such linear relationship is not really essential for every aspect of the present invention. It is seen that as soon as the throttle valve 10 is changed to its fully open position V, that is, until the curve $a$ in FIG. 1 has been reached, which fact permits to define a region I also in FIG. 5 wherein the regulation is performed as fill regulation. From the position B of the accelerator onward a brake load region follows which is identified by II and wherein the mixture regulation is performed by the actuation of an injection nozzle terminating in the antechamber. Thus in this region II there will be fed through the injection or inlet associated with the throttle valve a basic mixture to the cylinder and as a result of the regulation the composition of that mixture portion will be changed which reaches the ante-chamber by means of the injection arrangement.

It is within the scope of the present invention that there can be a certain overlapping of the regions I and II. The mixture regulation can take place also by means of changing the components of the basic mixture, during which regulation, however, the quantity of the injected fuel remains constant.

With reference now to FIG. 6 which illustrates the general construction of a combustion engine of the conventional type which, however, embodies principles of the present invention, it is seen that it includes a cylinder 20 in which a piston 21 is arranged for movement and which over a crank arm 22 operates in a known manner on a crank shaft. The cylinder 20 surrounds the combustion space 23 and by means of an extension thereof it surrounds an ante-chamber 24 into which an injection nozzle 25 protrudes. In a known manner the injection nozzle 25 includes an injection valve 26 which is coupled through a control valve 27 and through a conduit with the fuel distributor 8, the details of which are described in connection with FIG. 3. The ante-chamber 24 contains also the electrodes of a sparkplug 28 which protrude thereinto.

The combustion space 23 has a mixture supply conduit 29 connected thereto which contains a carburetor 30 constructed in a conventional manner. The carburetor 30 is supplied with fuel from a conduit 31 which contains also a control valve 32 and terminates the cylinder of the engine contains a mixture input valve 33 which is constructed in a known manner.

The supply of the fuel to the engine at various brake loads is performed as described above.

From the above, it is apparent that although the invention has been described hereinbefore with respect to a certain specific embodiment thereof, it is evident that many modifications and changes may be made without departing from the spirit of the invention. Accordingly, by the appended claims, I intend to cover all such modifications and changes as fall within the true spirit and scope of this invention.

Having thus described the invention, what I claim as new and desire to be secured by Letters Patent, is as follows:

1. In a motor vehicle, an engine having a plurality of cylinders, each of said cylinders comprising a combustion chamber having an inlet valve means connected to a carburetor means for the feeding of a fuel-air mixture to said combustion chamber and an ante-chamber communicating with said combustion chamber, said ante-chamber having an injection nozzle means associated therewith for feeding fuel into said ante-chamber and a spark-plug having electrodes terminating in said ante-chamber, means for controlling said carburetor means for feeding said mixture at partial brake loads of said engine on a range between a minimum and a maximum filling of said chambers and providing operating of said engine at brake loads below said partial brake loads by controlling the amount of mixture fed to said chambers, and means actuating said injection nozzle means when said partial brake loads go over to higher brake loads by controlling the amount of fuel fed by said fuel injection nozzle means, said control means of said carburetor means remaining effective at a maximum filling position during said higher brake loads:

2. The combination as claimed in claim 1, wherein said partial brake loads lie in the lower region of the engine revolutions and equal at least one fourth of the full brake loads.

3. The combination as claimed in claim 1, wherein said carburetor means comprises a throttle valve means having a drive means, said drive means fully opening said throttle valve means at brake loads corresponding to said partial brake loads and said higher brake loads.

4. The combination as claimed in claim 1, comprising a fuel pump means and a fuel distributor means distributing the fuel to the injection nozzles of the different cylinders, a valve means placed between said fuel pump means and said distributor means and having an operating mechanism for opening said associated valve means when said partial brake loads has been exceeded toward said higher brake loads.

5. The combination as claimed in claim 4, wherein said operating mechanism is coupled with said means for controlling said carburetor means.

6. The combination as claimed in claim 1, wherein during said filling control a mixture having an air excess number is fed to said engine at which the damaging components in the exhaust gas remain practically constant at an increase of the air excess number.

* * * * *